United States Patent
Nakamura

(10) Patent No.: US 6,177,996 B1
(45) Date of Patent: Jan. 23, 2001

(54) SENSOR UNIT AND DISTANCE MEASUREMENT APPARATUS

(75) Inventor: Kenji Nakamura, Sakai (JP)

(73) Assignee: Minolta Co., Ltd., Osaka (JP)

( * ) Notice: Under 35 U.S.C. 154(b), the term of this patent shall be extended for 0 days.

(21) Appl. No.: 09/348,840

(22) Filed: Jul. 8, 1999

(30) Foreign Application Priority Data

Jul. 14, 1998 (JP) .................................................. 10-198293

(51) Int. Cl.$^7$ ....................................................... G01B 11/14

(52) U.S. Cl. ........................ 356/375; 250/201.2; 396/123; 358/474

(58) Field of Search ...................................... 356/373, 375; 250/370.08, 370.15, 201.2, 201.1, 201.4, 201.6, 559.29, 559.31; 257/292, 443, 53; 396/123; 358/474, 486, 494

(56) References Cited

U.S. PATENT DOCUMENTS

| | | |
|---|---|---|
| 4,910,548 | 3/1990 | Taniguchi et al. . |
| 4,948,977 * | 8/1990 | Mulder ............................ 250/370.09 |
| 5,352,920 * | 10/1994 | Morishita et al. ................... 257/435 |
| 5,390,032 * | 2/1995 | Yamamoto et al. ................. 358/474 |

* cited by examiner

Primary Examiner—Hoa Q. Pham
(74) Attorney, Agent, or Firm—Burns, Doane, Swecker & Mathis, LLP

(57) ABSTRACT

A sensor unit of the present invention is provided with a plurality of line sensors disposed in parallel. Each of the line sensors has a light receiving element array comprising a plurality of light receiving elements arranged in an array, and a processing unit array disposed along the light receiving element array and for processing to output photocharges generated by the plurality of light receiving elements. At least two of the plurality of line sensors are disposed in such a manner that processing unit arrays thereof are opposed to each other.

17 Claims, 12 Drawing Sheets

SENSOR UNIT AND DISTANCE MEASUREMENT APPARATUS

This application is based on application No. H10-198293 filed in Japan on Jul. 14, 1998, the entire content of which is hereby incorporated by reference.

BACKGROUND OF THE INVENTION

1. Field of the Invention

The present invention relates to a sensor unit in which a plurality of line sensors receiving light and generating photocharges are arranged, and a distance measurement apparatus having the sensor unit as the distance measurement sensor being used, for example, for automatic focusing of a camera.

2. Description of the Prior Art

A distance measurement apparatus measures the distance by applying the principle of the triangulation, and is used, for example, for an automatic focusing (AF) mechanism of a camera. As a distance measurement method for the distance measurement apparatus, a method which uses passive light is known. Hereinafter, this method will be called a passive correlation method. According to this method, the input image is used as it is without irradiating distance measurement light. The principle of this distance measurement method will be described.

FIG. 7A shows an example of a distance measurement apparatus employing the passive correlation method. FIG. 7B shows an image signal obtained from an image sensor of this apparatus comprising a charge-coupled device (CCD). Incident light rays from lenses 100 disposed on the left and the right sides are aligned and imaged on the light receiving surface of a one-dimensional CCD 103 by use of mirrors 101 and a prism 102. The image signal of the CCD 103 is, for example, as shown in FIG. 7B. The longitudinal axis corresponds to the position on the CCD 103, whereas the lateral axis represents the level of the image signal. The distance between the two images varies in correspondence with the distance to the subject. The distance between the two images is obtained by a correlation calculation of the image signal, and from the obtained distance, the distance to the subject can be determined. This is the principle of the passive correlation method.

Conventionally, many distance measurement apparatuses for cameras using the passive correlation method have performed distance measurement with one line of distance measurement area 61 horizontally to a photographic image plane 60 of a camera as shown in FIG. 1. The distance measurement sensor provided in the conventional distance measurement apparatuses has a structure, for example, as shown in FIG. 2 where a pair of left and right line sensors 75 and 76 are disposed with a control circuit 10 in between. The pair of line sensors 75 and 76 are situated substantially on the imaging surfaces of a pair of lenses disposed with a predetermined optical axis-to-optical axis distance therebetween. The line sensors 75 and 76 receive subject image light with light receiving element arrays 12 comprising a plurality of light receiving elements.

The photocharges generated by the light receiving element arrays 12 are transferred and outputted one by one for each pixel by a processing unit 11 in accordance with a clock supplied from the control circuit 10. Based on the output of the distance measurement sensor, a microcomputer calculates the distance to the subject.

The distance measurement sensor shown in FIG. 3 also has a pair of left and right line sensors 77 and 78 so as to have a function similar to that of the above-described distance measurement sensor (FIG. 2). Processing units 31 are provided on both sides with the light receiving element arrays 12 in between for each pixel. Since the detection of one line of distance measurement area is performed with a pair of left and right line sensors, a pair of left and right line sensors will sometimes be referred to as one line sensor.

In the above-described conventional distance measurement apparatuses, however, since the distance measurement area 61 merely traverses the central part of the photographic image plane 60 as shown in FIG. 1, distance measurement is impossible when the subject 62 is situated in the lower part or the upper part of the image plane 60.

To ensure the distance measurement of the subject 62, a structure has been disclosed which enables distance measurement in a wide range, for example, by providing a plurality of lines of distance measurement areas 63 to 65 as shown in FIG. 4. In this structure, the larger the distance D1 between the distance measurement areas 63 and 65 at both ends is, the wider the range where subject detection and distance detection can be performed with a small number of lines is.

Examples of such distance measurement apparatuses having a plurality of lines of distance measurement areas include one having a distance measurement sensor structured as shown in FIG. 5. The distance measurement sensor 85 shown in FIG. 5 has two pairs of line sensors 81 to 84 and performs distance measurement with two lines.

The distance measurement sensor 85 has the control circuit 10 on the axis of symmetry. The two pairs of line sensors 81 to 84 are disposed in such a manner that the light receiving element arrays 12 and the accompanying processing unit arrays 11 are oriented in one direction.

When a plurality of distance measurement areas are provided as shown in FIG. 4, the larger the distance between the distance measurement areas (the range covered by the line sensors) is, the wider the range where subject detection and distance detection are possible is. It has been found that the distance measurement detection accuracy generally increases as the product of the optical axis-to-optical axis distance (base length) between a pair of lenses and the focal length of the lenses increases. When a high distance measurement detection accuracy is required (for example, when the focal length of the focal distance system of the taking system is long), it is necessary to increase the base length or the focal length.

When the focal length of the distance detecting system is increased, in order to increase the distance between the line sensors on the photographic image plane, it is necessary that the distance between the line sensors be larger (than that in the case where the focal length is short) in accordance therewith. This will be described with reference to FIGS. 6A and 6B. The focal length of the distance detecting system is shorter in FIG. 6A than in FIG. 6B. In a case where the distance D2 between the distance measurement areas at both ends is obtained with respect to a photographic image plane G, when the distance between both ends of line sensors 91 to 93 in FIG. 6A is d8 and the distance between both ends of line sensors 94 to 96 is d9, d9>d8 as is apparent from the figures.

As described above, when the focal length is increased, it is necessary to increase the distance between the line sensors. However, increase in the distance between the line sensors increases the size of the device (designated 85 in FIG. 5) constituting the line sensor. However, it is difficult to increase the size of the device constituting the line sensor because of yield and cost constraints.

For this reason, when the focal length of the distance detecting system is increased in order to increase the distance detection accuracy in a case where the focal length of the taking system is long, it is impossible to dispose the distance measurement areas with a sufficient distance therebetween within the image plane, so that it is impossible to improve the reliability of subject detection by detecting a wide area.

SUMMARY OF THE INVENTION

An object of the present invention is to provide a sensor unit and a distance measurement apparatus with the sensor unit capable of solving the above-described problems.

Another object of the present invention is to provide a low-cost sensor unit where the line distance can be increased, and a distance measurement apparatus capable of subject detection in a wide range with a high distance detection accuracy by using such a sensor unit.

To achieve the above-mentioned object, a sensor unit according to the present invention is provided with: a first line sensor including a light receiving element array comprising a plurality of light receiving elements arranged in an array, and a processing unit array disposed along the light receiving element array and for processing to output photocharges generated by the plurality of light receiving elements; and a second line sensor including a light receiving element array comprising a plurality of light receiving elements arranged in an array, and a processing unit array disposed along the light receiving element array and for processing to output photocharges generated by the plurality of light receiving elements. The first and the second line sensors are disposed in parallel with each other in such a manner that the processing unit arrays thereof are opposed to each other.

Moreover, a sensor unit according to the present invention is provided with a plurality of line sensors. Each of the plurality of line sensors has a light receiving element array comprising a plurality of light receiving elements arranged in an array, and a processing unit array disposed along the light receiving element array and for processing to output photocharges generated by the plurality of light receiving elements. The plurality of line sensors are disposed in parallel. And at least two of the plurality of line sensors are disposed in such a manner that processing unit arrays thereof are opposed to each other.

Moreover, a distance measurement apparatus according to the present invention is provided with: a plurality of line sensors disposed in parallel; first and second optical systems for projecting subject images onto the plurality of line sensors; and a calculator for obtaining a distance to a subject by performing a correlation calculation of signals outputted from the plurality of line sensors in correspondence with the subject images projected by the first and second optical systems. Each of the line sensors has a light receiving element array comprising a plurality of light receiving elements arranged in an array and for converting received light into electric signals, and a processing unit array disposed along the light receiving element array and for processing to output the electric signals converted by the plurality of light receiving elements. At least two of the plurality of line sensors are disposed in such a manner that processing unit arrays thereof are opposed to each other.

BRIEF DESCRIPTION OF THE DRAWINGS

This and other objects and features of this invention will become clear from the following description, taken in conjunction with the preferred embodiments with reference to the accompanying drawings in which.

DESCRIPTION OF THE PREFERRED EMBODIMENTS

First Embodiment

Figure 1:
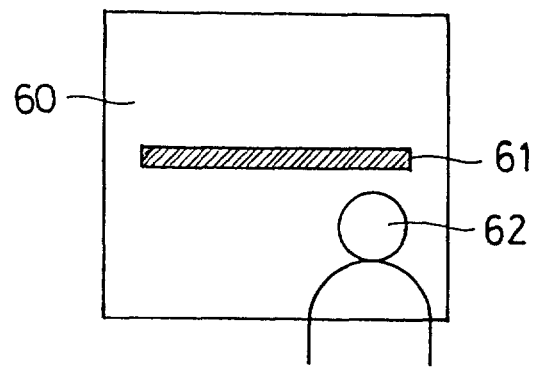
FIG. 1 is a view showing the distance measurement area with respect to the photographic image plane in the conventional distance measurement apparatus.
Figure 2:
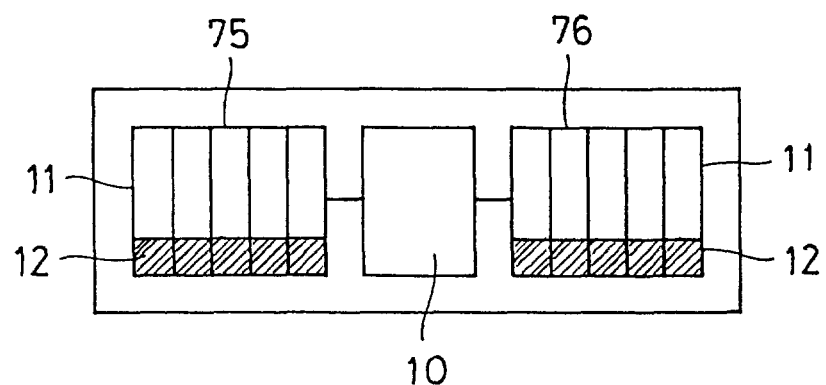
FIG. 2 is a structural view of an example of the distance measurement sensor of the conventional distance measurement apparatus.
Figure 3:
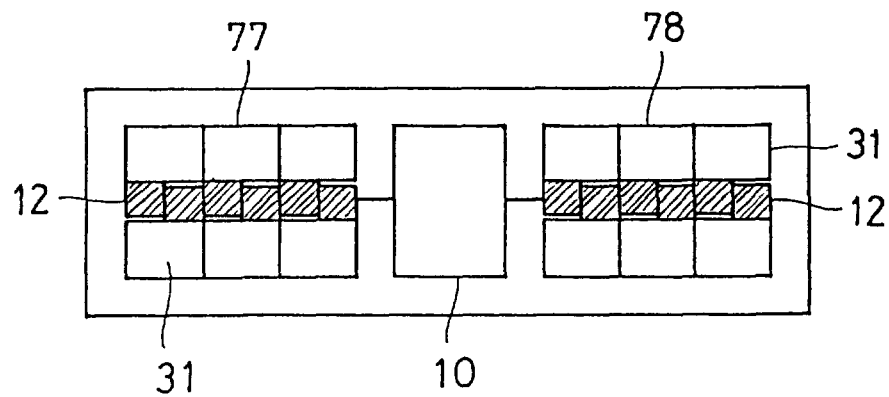
FIG. 3 is a structural view of another example of the distance measurement sensor of the conventional distance measurement apparatus.
Figure 4:
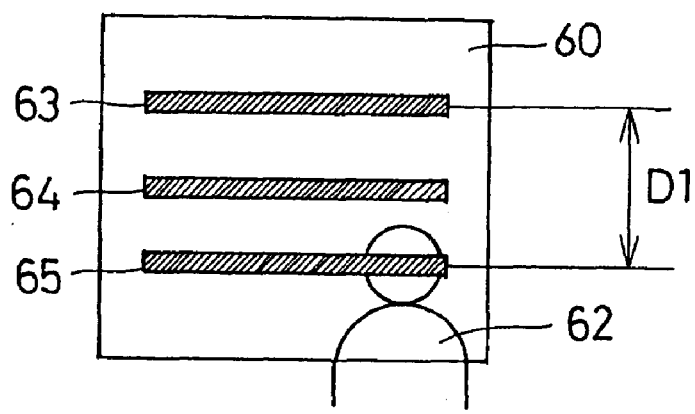
FIG. 4 is a view showing the relationship between the photographic image plane and the distance measurement areas in the distance measurement apparatus having a plurality of lines of distance measurement areas.
Figure 5:
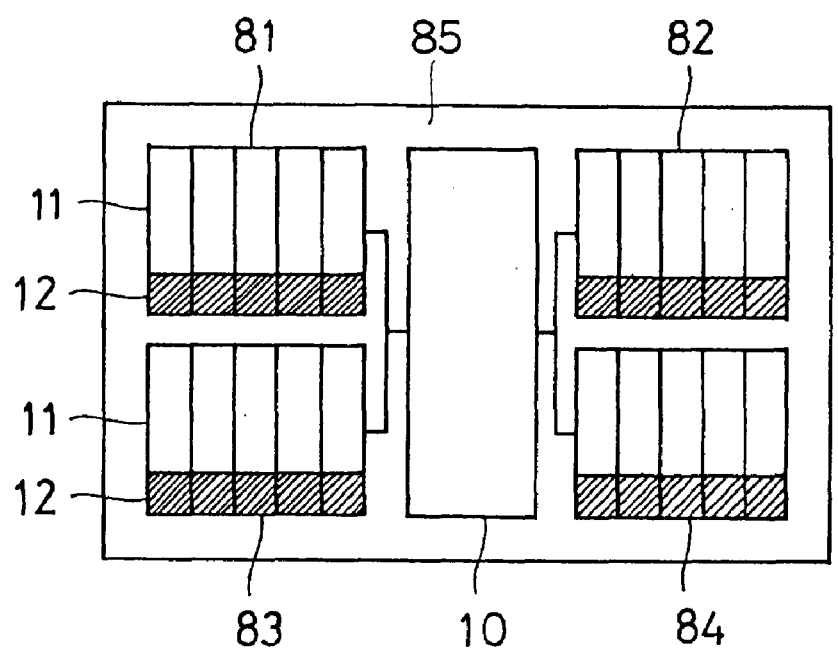
FIG. 5 is a structural view of the distance measurement sensor of the conventional distance measurement apparatus having a plurality of lines of distance measurement areas.
Figure 6A:
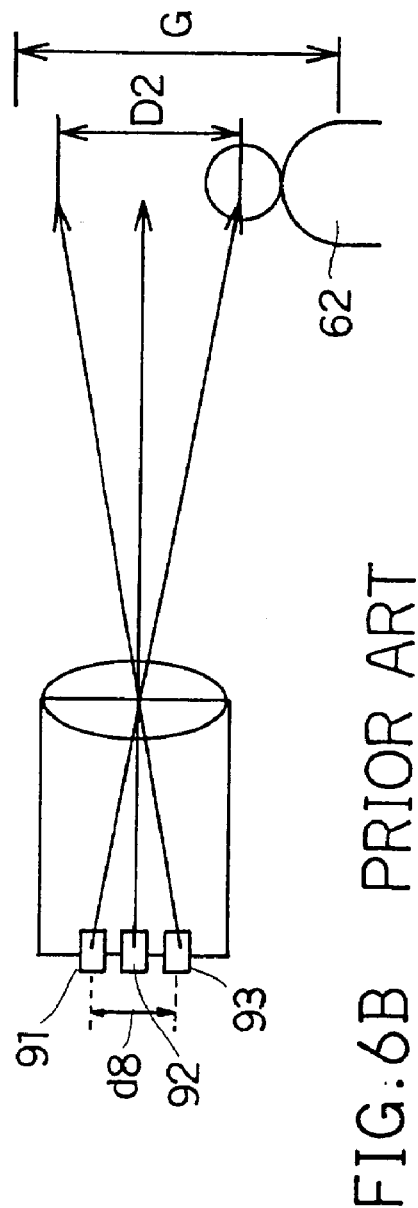
FIGS. 6A and 6B are schematic views showing the relationship between the distance measurement positions and the line sensors of the distance measurement sensor of the conventional distance measurement apparatus having a plurality of lines of distance measurement areas.
Figure 6B:
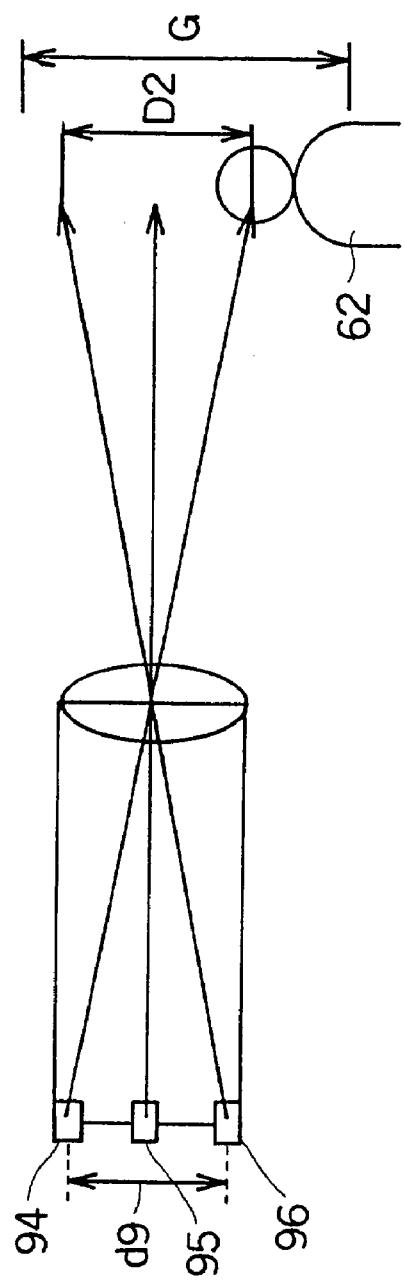
Figures 7A, 7B:
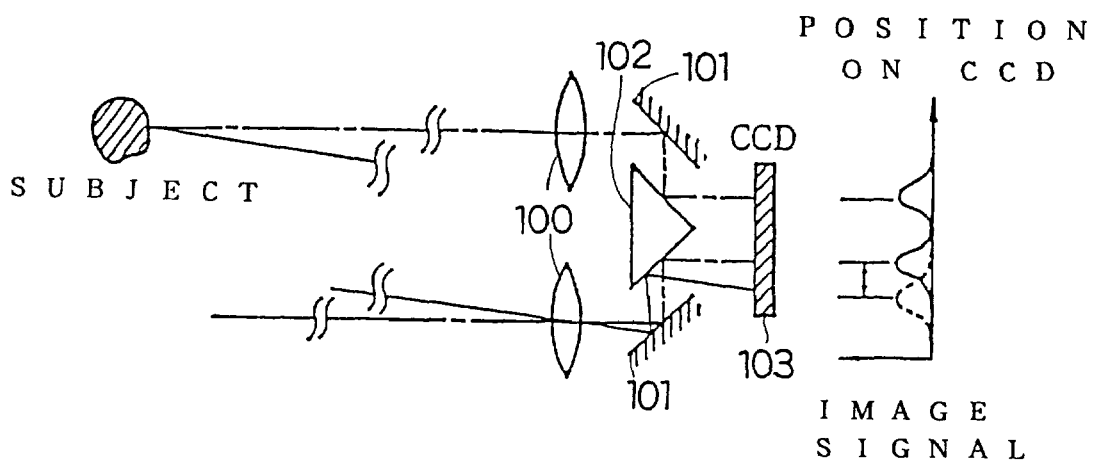
FIGS. 7A and 7B are views of assistance in explaining the principle of the passive correlation in the distance measurement apparatus.
Figure 8:
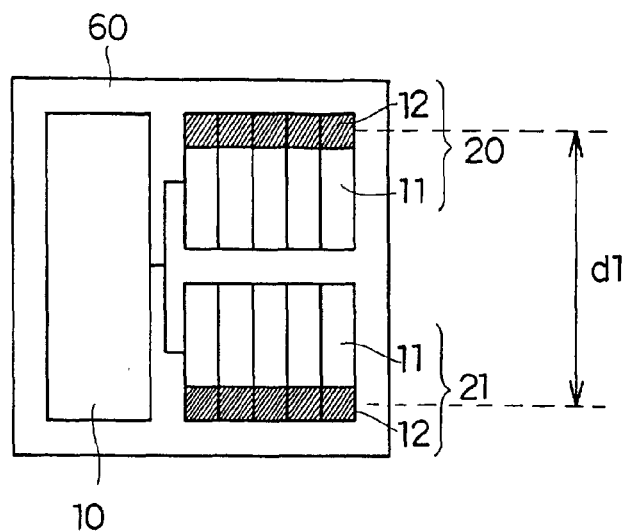
FIG. 8 is a view showing the structure of a sensor unit according to a first embodiment.

FIG. 8 shows the structure of a sensor unit according to a first embodiment. The sensor unit 60 comprises two line sensors 20 and 21 disposed in parallel and the control circuit 10 for controlling them. The control circuit 10 generates various clocks for signal transfer, and supplies the clocks to the line sensors 20 and 21. The line sensors 20 and 21 each comprise a light receiving element array 12 comprising a plurality of light receiving elements and a processing unit array 11 for processing to output photocharges generated by the light receiving element array 12. As the light receiving elements, for example, photodiodes are used. The two line sensors 20 and 21 are disposed in such a manner that the processing unit arrays 11 are opposed to each other.

Therefore, in the sensor unit 60 of this embodiment, the distance d1 from the upper light receiving element array 12 to the lower light receiving element array 12 is longer than that in a conventional arrangement where two line sensors are disposed in such a manner that the light receiving element arrays and the processing unit arrays are oriented in one direction. In addition, the overall size of the device 60 is the same. Consequently, a subject in a wider range can be detected without any cost increase.

Figure 9:
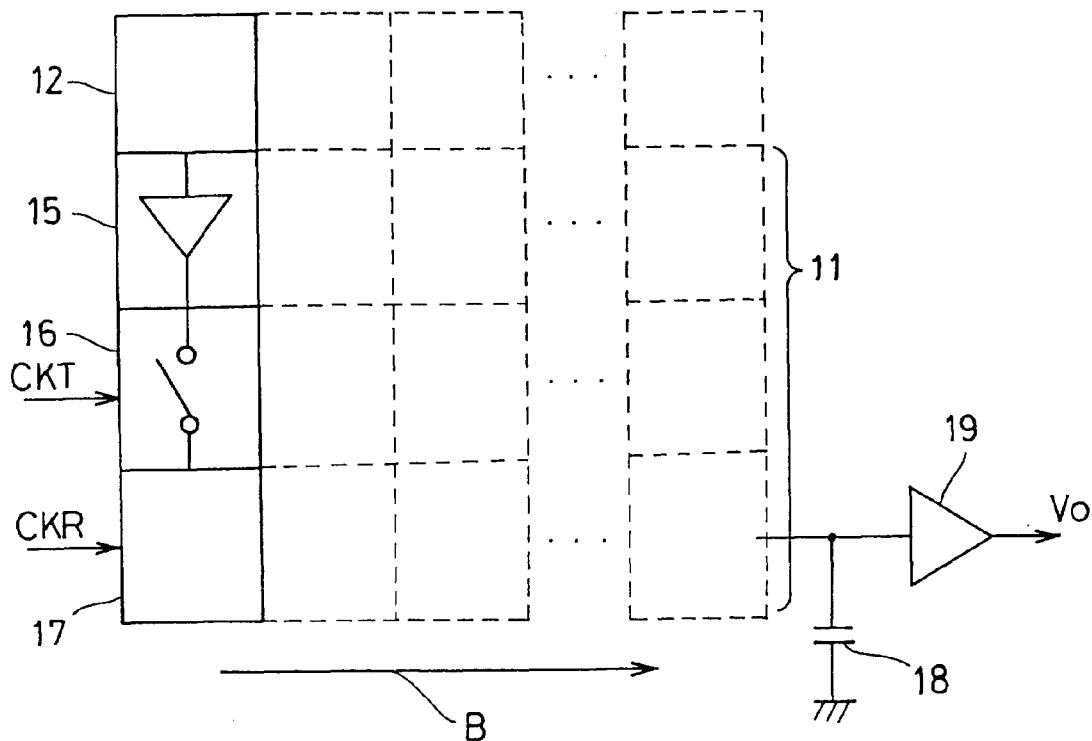
FIG. 9 is a detailed view of a light receiving element array and a processing unit array of the sensor unit of FIG. 8.

FIG. 9 shows the relationship between the processing unit array 11 and the light receiving element array 12. The processing unit array 11 comprises an amplifier 15, a switch 16 and a shift register 17. In the light receiving element array 12, photocharges generated by light reception are accumulated for each pixel. The switch 16 is turned on and off in response to a clock CKT transmitted from the control circuit 10 (see FIG. 8). In accordance with the clock CKT, the photocharges are transmitted from the light receiving element array 12 by way of the amplifier 15 and the switch 16 to the shift register 17.

To the shift register 17, a clock CKR for transfer from the control circuit 10 (see FIG. 8) is supplied, and the signals of the photocharges are transferred one by one in the direction of the arrow B for each pixel. The clock CKR is mainly a two-phase or a three-phase clock. The signals are converted into a signal voltage Vo by a stray diffusion capacitance 18 and an amplifier 19 being present on the output side, and outputted from the sensor unit 60 (see FIG. 8). Thus, the sensor unit 60 of this embodiment is formed as a CCD. The sensor units of the embodiments described below are also formed as CCDs.

Second Embodiment

Figure 10:
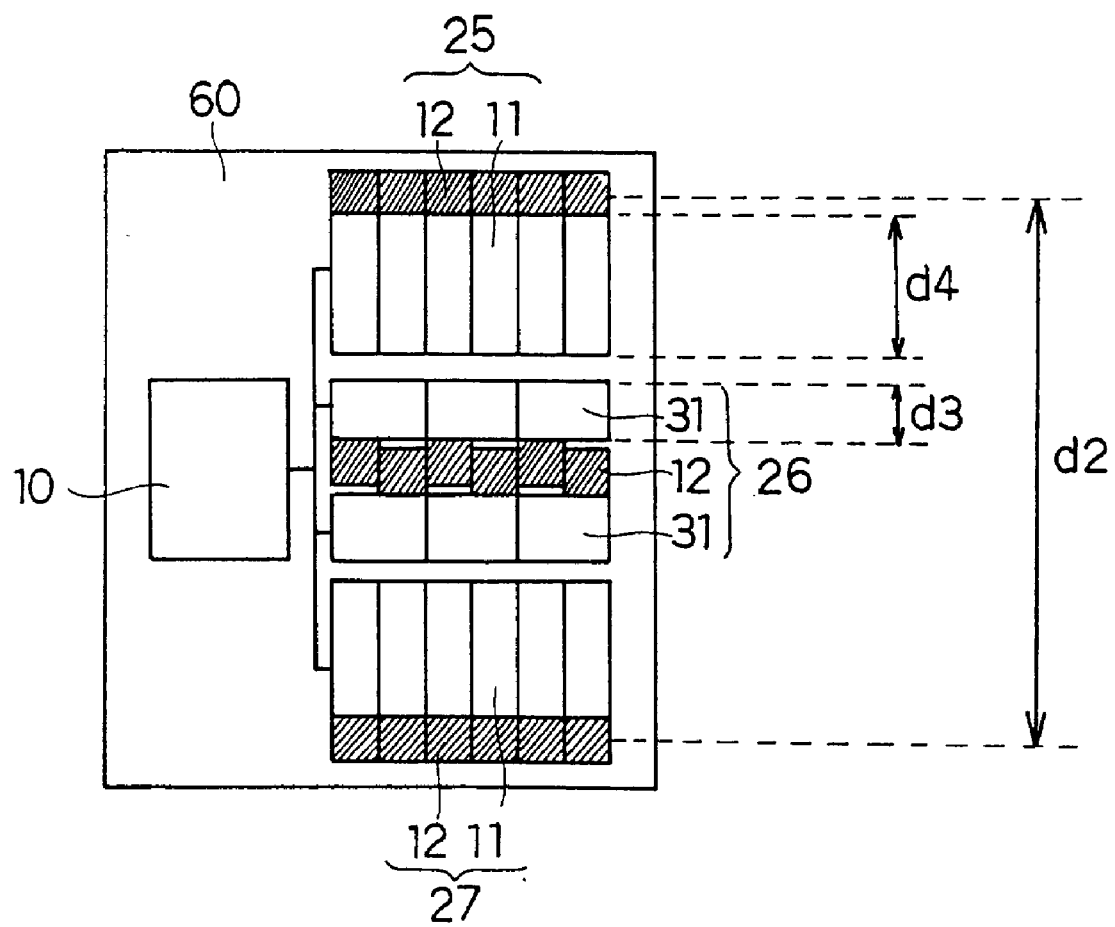
FIG. 10 is a view showing the structure of a sensor unit according to a second embodiment.

FIG. 10 shows the structure of a sensor unit according to a second embodiment. The sensor unit 60 comprises three line sensors 25, 26 and 27 disposed in parallel and the control circuit 10 for controlling them. The control circuit 10 generates various clocks for signal transfer, and supplies the clocks for signal transfer to the line sensors 25, 26 and 27.

The line sensors 25 and 27 are disposed in a similar manner to the line sensors 20 and 21 of the first embodiment. The line sensor 26 is disposed between the two line sensors. The line sensor 26 is arranged so that the light receiving element array 12 thereof is situated in the center of the line sensor 26. Processing unit arrays 31 of the line sensor 26 are disposed on both sides of the light receiving element array 12 so as to be symmetrical in a vertical direction.

In the line sensor 26, the light receiving element array 12 and the processing unit arrays 31 are arranged so that the light receiving element and the processing unit form an L-shaped pattern for each pixel and that the patterns of adjoining pixels mesh with each other. Consequently, the processing unit of each pixel can take the width corresponding to two pixels, so that the length d3 of the processing unit arrays 31 can be reduced so as to be smaller than the length d4 of the processing unit arrays 11.

Because of the above-described structure, in the sensor unit 60 of this embodiment, the distance d2 from the uppermost light receiving element array 12 to the lowermost light receiving element array 12 is longer than that in a conventional arrangement where three line sensors are disposed in such a manner that the light receiving element arrays and the processing unit arrays are oriented in one direction. In addition, the overall size of the device 60 is the same. Consequently, a subject in a wider range can be detected without any cost increase.

Figure 11:
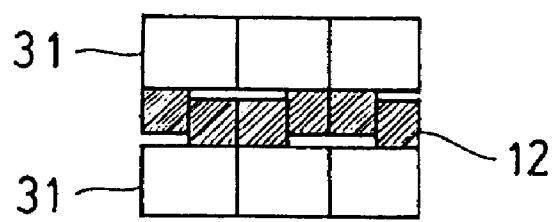
FIG. 11 is a partially enlarged view showing a part of another example of a central line sensor of the sensor unit of FIG. 10.

The arrangement pattern of the central line sensor 26 may be changed. For example, as shown in FIG. 11, the processing unit arrays 31 may be disposed so as to be opposed to each other with the light receiving element array 12 in between every other pixel except for the pixels at both ends.

Third Embodiment

Figure 12:
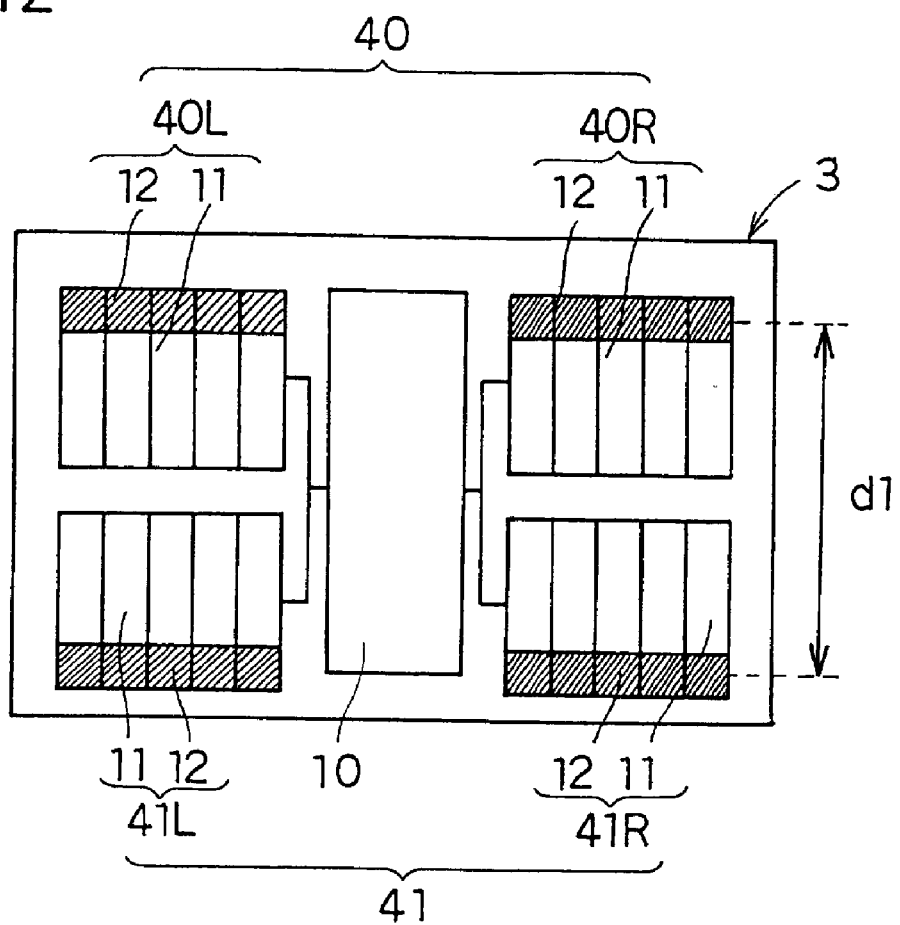
FIG. 12 is a view showing the structure of a sensor unit according to a third embodiment.

FIG. 12 shows the structure of a sensor unit according to a third embodiment. The sensor unit 3 comprises two line sensors 40 (40L, 40R) and 41 (41L, 41R) disposed in parallel and the control circuit 10 for controlling them. The line sensors 40 and 41 are each divided into the left and the right areas with the control circuit 10 in between. The line sensor 40 comprises the left area 40L and the right area 40R. The line sensor 41 comprises the left area 41L and the right area 41R. The control circuit 10 generates various clocks for signal transfer, and supplies the clocks for signal transfer to the line sensors 40 and 41. The left and the right areas of the line sensors with the control circuit 10 in between are disposed in a similar manner as the line sensors 20 and 21 of the first embodiment.

Because of the above-described structure, in the sensor unit 3 of this embodiment, the distance d1 from the upper light receiving element array 12 to the lower light receiving element array 12 is longer, although the device size is the same, than that in a conventional arrangement where two line sensors are disposed in such a manner that the light receiving element arrays and the processing unit arrays are oriented in one direction.

Fourth Embodiment

Figure 13:
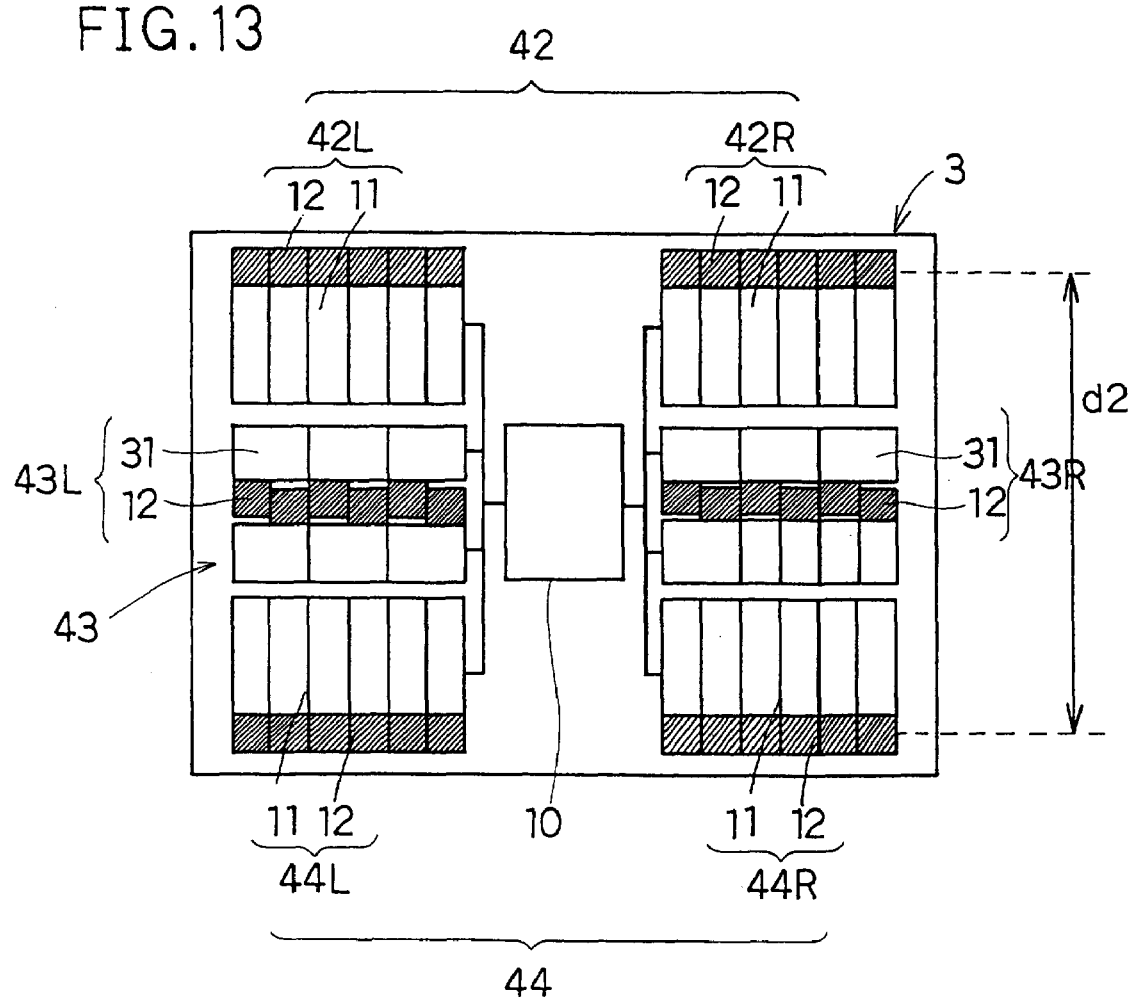
FIG. 13 is a view showing the structure of a sensor unit according to a fourth embodiment.

FIG. 13 shows the structure of a sensor unit according to a fourth embodiment. The sensor unit 3 comprises three line sensors 42 (42L, 42R), 43 (43L, 43R) and 44 (44L, 44R) disposed in parallel and the control circuit 10 for controlling them. The line sensors 42, 43 and 44 are each divided into the left and the right areas with the control circuit 10 in between. The line sensor 42 comprises the left area 42L and the right area 42R. The line sensor 43 comprises the left area 43L and the right area 43R. The line sensor 44 comprises the left area 44L and the right area 44R. The control circuit 10 generates various clocks for signal transfer, and supplies the clocks for signal transfer to the line sensors 42, 43 and 44.

The left and the right areas of the line sensors with the control circuit 10 in between are disposed in a similar manner as the line sensors 25, 26 and 27 of the second embodiment.

Because of the above-described structure, in the sensor unit 3 of this embodiment, the distance d2 from the upper light receiving element array 12 to the lower light receiving element array 12 is longer, although the device size is the same, than that in a conventional arrangement where two line sensors are disposed in such a manner that the light receiving element arrays and the processing unit arrays are oriented in one direction.

Fifth Embodiment

Figure 14:
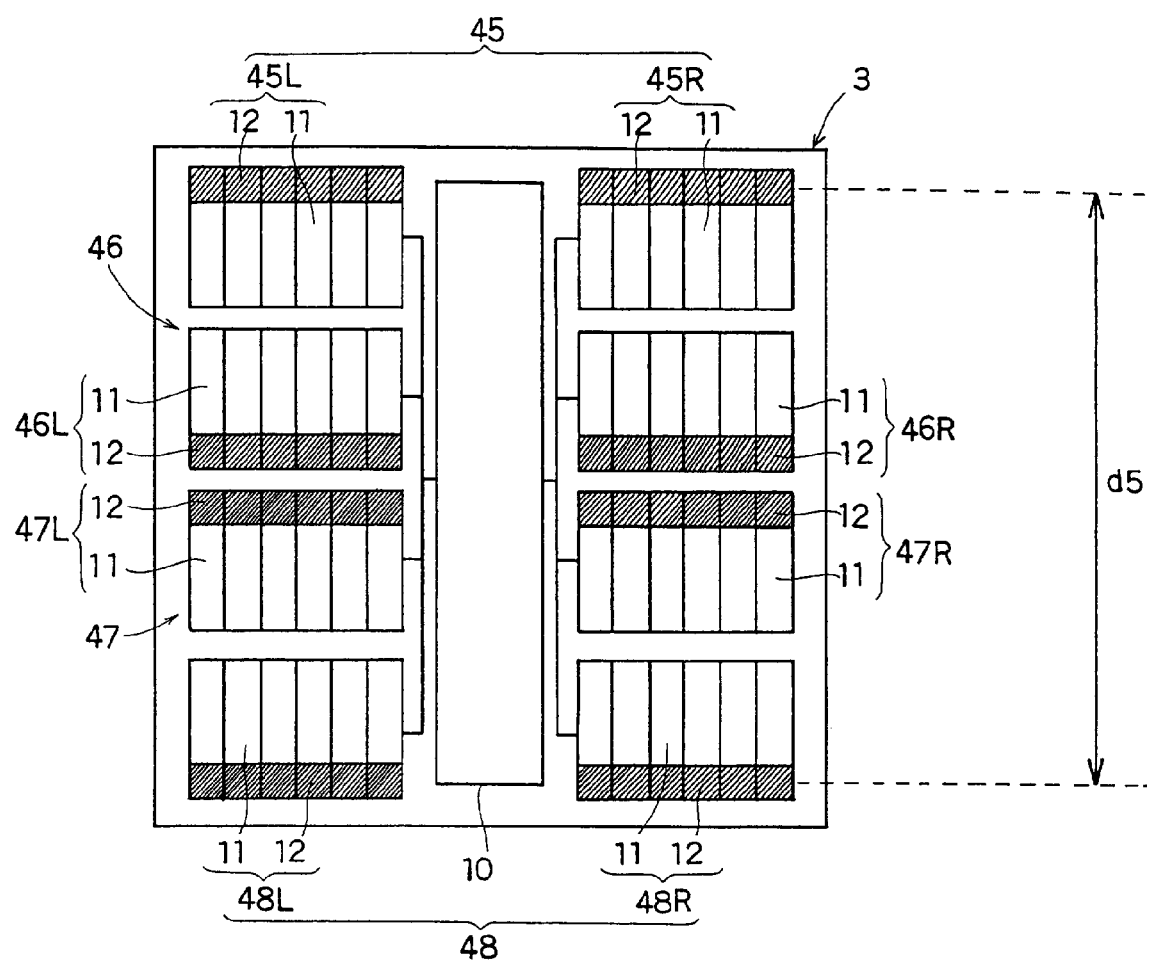
FIG. 14 is a view showing the structure of a sensor unit according to a fifth embodiment.

FIG. 14 shows the structure of a sensor unit according to a fifth embodiment. The sensor unit 3 comprises four line sensors 45 (45L, 45R), 46 (46L, 46R), 47 (47L, 47R) and 48 (48L, 48R) disposed in parallel and the control circuit 10 for controlling them. The line sensors 45, 46, 47 and 48 are each divided into the left and the right areas with the control circuit 10 in between.

The line sensor 45 comprises the left area 45L and the right area 45R. The line sensor 46 comprises the left area 46L and the right area 46R. The line sensor 47 comprises the left area 47L and the right area 47R. The line sensor 48 comprises the left area 48L and the right area 48R. The control circuit 10 generates various clocks for signal transfer, and supplies the clocks for signal transfer to the line sensors 45, 46, 47 and 48. The line sensors 45 and 46 and the line sensors 47 and 48 are disposed in a similar manner as the line sensors 40 and 41 of the third embodiment.

Because of the above-described structure, in the sensor unit 3 of this embodiment, the distance d5 from the uppermost light receiving element array 12 to the lowermost light receiving element array 12 is longer, although the device size is the same, than that in a conventional arrangement where four line sensors are disposed in such a manner that the light receiving element arrays and the processing unit arrays are oriented in one direction.

Sixth Embodiment

Figure 15:
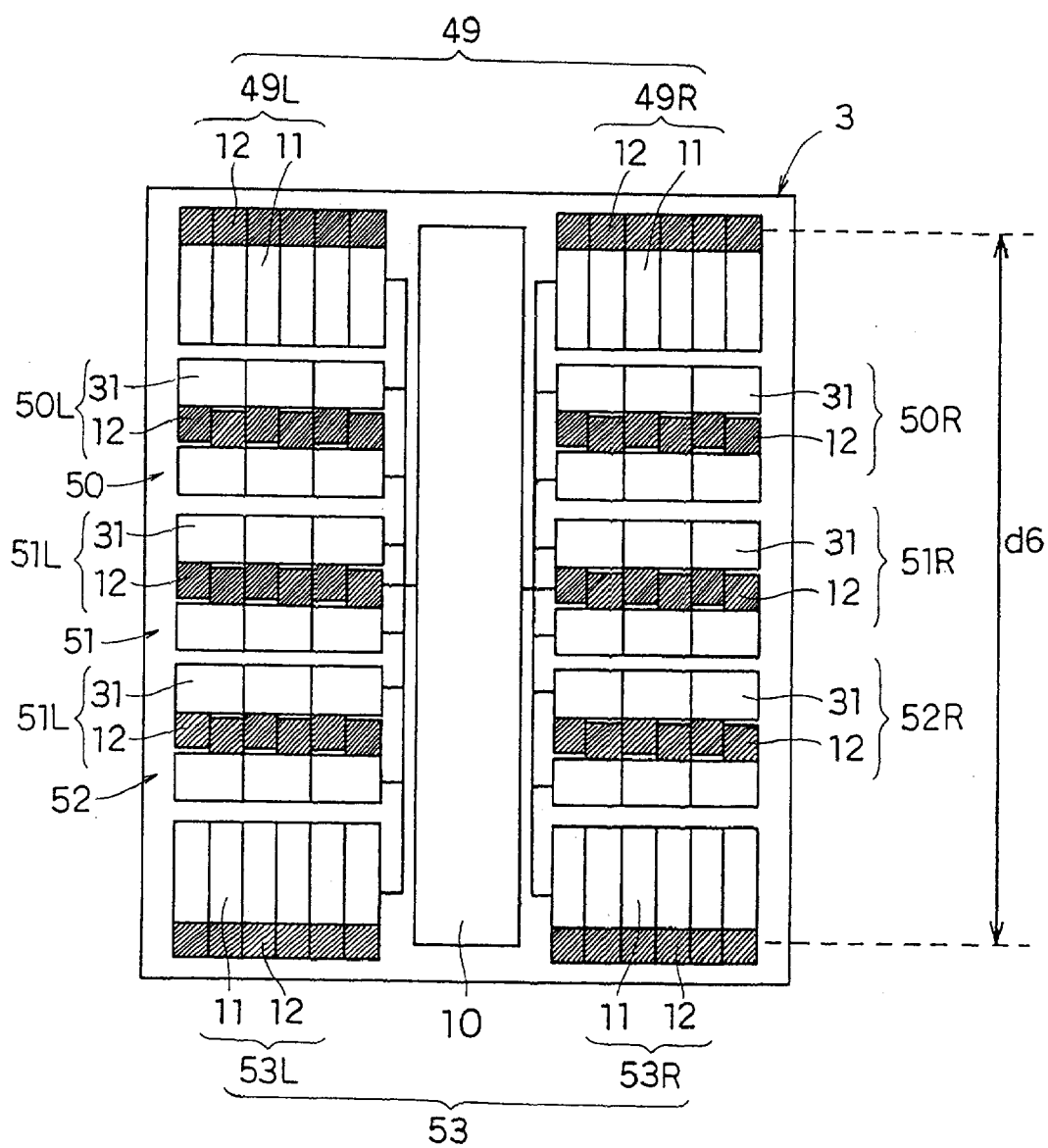
FIG. 15 is a view showing the structure of a sensor unit according to a sixth embodiment.

FIG. 15 shows the structure of a sensor unit according to a sixth embodiment. The sensor unit 3 comprises five line sensors 49 (49L, 49R), 50 (50L, 50R), 51 (51L, 51R), 52 (52L, 52R) and 53 (53L, 53R) disposed in parallel and the control circuit 10 for controlling them. The line sensors 49 to 53 are each divided into the left and the right areas with the control circuit 10 in between.

The line sensor 49 comprises the left area 49L and the right area 49R. The line sensor 50 comprises the left area 50L and the right area 50R. The line sensor 51 comprises the left area 51L and the right area 51R. The line sensor 52 comprises the left area 52L and the right area 52R. The line sensor 53 comprises the left area 53L and the right area 53R. The control circuit 10 generates various clocks for signal transfer, and supplies the clocks for signal transfer to the line sensors 49 to 53.

The line sensors 49 and 53 are disposed in a similar manner as the line sensors 40 and 41 of the third embodiment. In the sensor unit 3 of this embodiment, the three line sensors 50, 51 and 52 arranged in a similar manner to the line sensor 43 of the fourth embodiment are disposed between the two line sensors 49 and 53.

Because of the above-described structure, in the sensor unit 3 of this embodiment, the distance d6 from the uppermost light receiving element array 12 to the lowermost light receiving element array 12 is longer, although the device size is the same, than that in a conventional arrangement where five line sensors are disposed in such a manner that the light receiving element arrays and the processing unit arrays are oriented in one direction.

Seventh Embodiment

Figure 16:
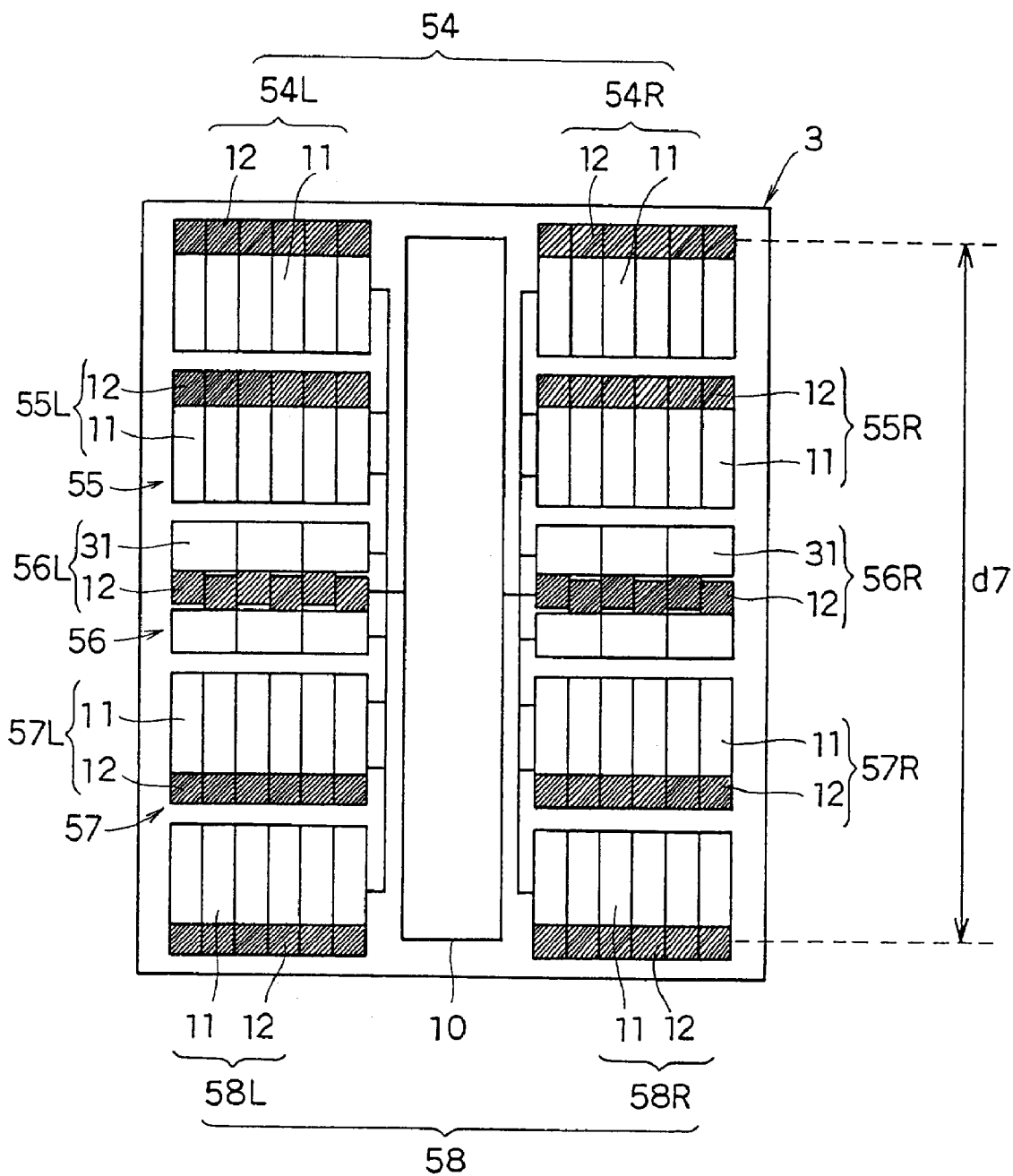
FIG. 16 s a view showing the structure of a sensor unit according to a seventh embodiment.

FIG. 16 shows the structure of a sensor unit according to a seventh embodiment. The sensor unit 3 comprises five line sensors 54 (54L, 54R), 55 (55L, 55R), 56 (56L, 56R), 57 (57L, 57R) and 58 (58L, 58R) disposed in parallel and the control circuit 10 for controlling them. The line sensors 54 to 58 are each divided into the left and the right areas with the control circuit 10 in between.

The line sensor 54 comprises the left area 54L and the right area 54R. The line sensor 55 comprises the left area 55L and the right area 55R. The line sensor 56 comprises the left area 56L and the right area 56R. The line sensor 57 comprises the left area 57L and the right area 57R. The line sensor 58 comprises the left area 58L and the right area 58R. The control circuit 10 generates various clocks for signal transfer, and supplies the clocks for signal transfer to the line sensors 54 to 58.

The line sensors 54 and 58 and the line sensors 55 and 57 are disposed in a similar manner to the line sensors 40 and 41 of the third embodiment. In the sensor unit 3 of this embodiment, the line sensor 56 arranged in a similar manner to the line sensor 43 of the fourth embodiment is disposed between the line sensors 55 and 57.

Because of the above-described structure, in the sensor unit 3 of this embodiment, the distance d7 from the uppermost light receiving element array 12 to the lowermost light receiving element array 12 is longer, although the device size is the same, than that in a conventional arrangement where five line sensors are disposed in such a manner that the light receiving element arrays and the processing unit arrays are oriented in one direction. Since the number of line sensors constituting the sensor unit 3 of this embodiment is the same as that in the sixth embodiment, the distance d7 and the distance d6 are the same.

Eight Embodiment

Figure 17:
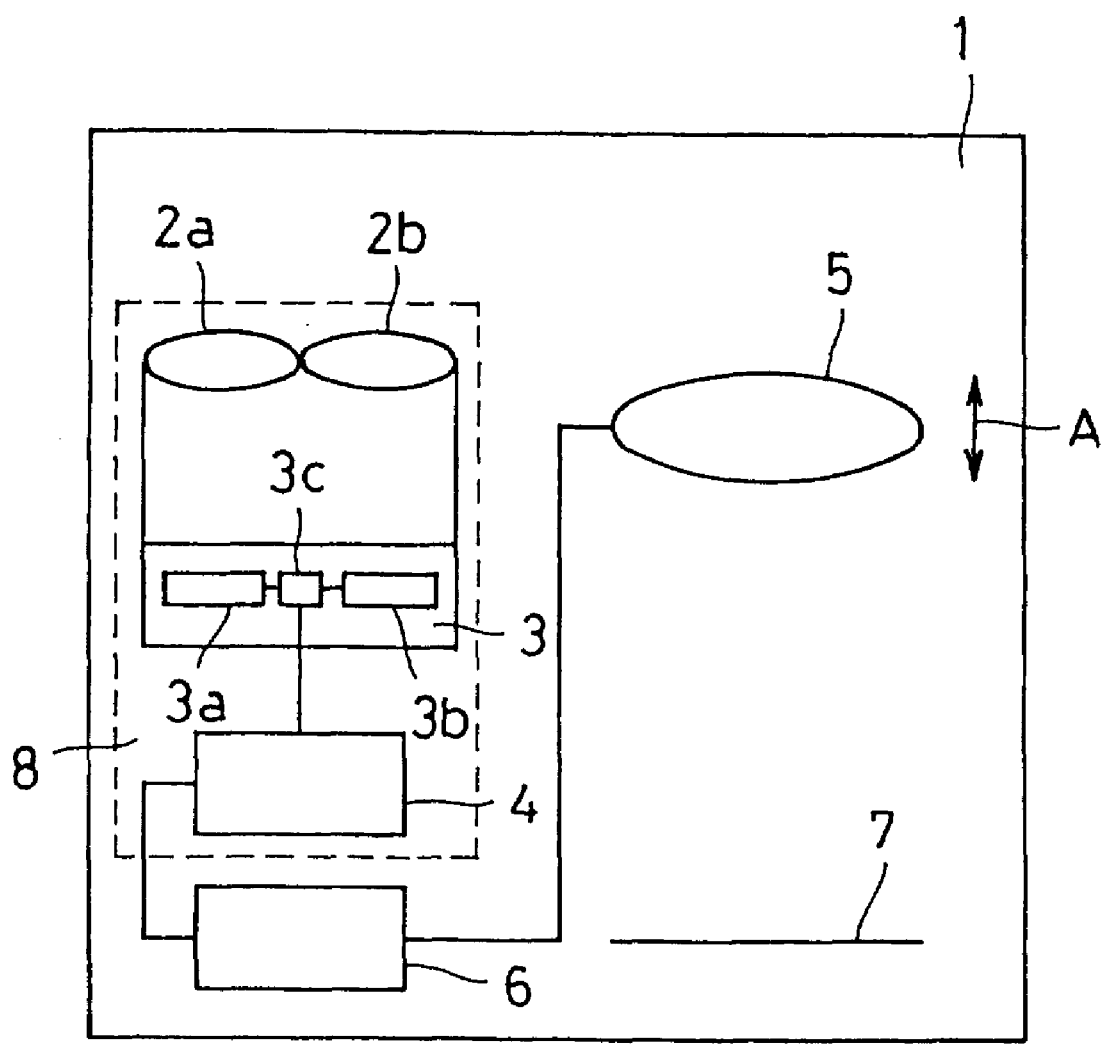
FIG. 17 is a block diagram of an image sensing apparatus provided with a distance measurement apparatus according to an eighth embodiment.

FIG. 17 is a block diagram of an image sensing apparatus 1 provided with a distance measurement apparatus according to an eighth embodiment. The image sensing apparatus 1 images a subject onto image sensing means 7 such as silver halide film by an image sensing optical system 5. A distance measurement apparatus 8 detects the distance to the subject. Based on the detected distance to the subject, a microcomputer 4 incorporated in the distance measurement apparatus 8 performs focusing by moving the image sensing optical system 5 as shown by the arrow A by driver 6 comprising a motor.

The distance measurement apparatus 8 comprises a pair of distance detecting optical systems 2a and 2b disposed in parallel, a distance measurement sensor 3 having a plurality of line sensors in which the left and the right areas disposed substantially on the imaging surfaces of the optical systems 2a and 2b pair up, and the microcomputer 4 serving as means for calculating the distance to the subject based on a signal from the distance measurement sensor 3. While only a control circuit 3c and left and right areas 3a and 3b constituting the line sensor that receives light through the optical systems 2a and 2b are shown in the distance measurement sensor 3, the distance measurement sensor 3 has a plurality of line sensors comprising the left and the right areas so that distance measurement can be performed with a plurality of lines.

In this embodiment, any one of the line sensors 3 shown in the third to the seventh embodiments is used as the distance measurement sensor 3. The description of the structures of the sensor units 3 is omitted since they have been detailed in the embodiments. By using these sensor units, the distance between the uppermost and the lowermost light receiving element arrays is longer than conventional sensors having the same number of line sensors although the device size is the same. Consequently, the distance between the distance measurement areas at both ends can be increased even if the focal length of the distance detecting system is increased.

In FIG. 17, the microcomputer 4 obtains the distance to the subject based on a signal from the distance measurement sensor 3 by the passive correlation method to which the principle of triangulation is applied. This method in this embodiment will briefly be described.

First, the microcomputer 4 selects a line where the subject is sensed based on signals from a plurality of lines. Then, the microcomputer 4 obtains the distance between the subject images in the left and the right areas of the line sensor of the distance measurement sensor 3. In each module of the distance measurement apparatus, the relationship between the distance to the subject and the distance between the subject images has already been measured, and the result of the measurement is stored in the microcomputer 4. In distance measurement, the microcomputer 4 obtains the distance to the subject based on the stored measurement result.

When subject images are obtained from a plurality of lines, the detection accuracy can be improved by calculating the distance to the subject for each line and totaling the calculation results.

According to the sensor unit of the present invention, since the distance between the line sensors is increased, light can be detected in a wide range although the number of line sensors is the same. The use of this sensor unit as the distance measurement sensor of the distance measurement apparatus improves the distance measurement accuracy and the reliability of subject detection. For example, even when the focal length of the distance detecting system is long and in order to increase the distance between the distance measurement areas on the photographic image plane, the distance between the line sensors must be larger than that in a case where the focal length is short, a distance measurement apparatus having such a distance measurement sensor can easily be formed without any cost increase.

Obviously, many modifications and variations of the present invention are possible in light of the above teachings. It is therefore to be understood that within the scope of the appended claims, the invention may be practiced other than as specifically described.

What is claimed is:

1. A sensor unit comprising:

a first line sensor including a light receiving element array comprising a plurality of light receiving elements arranged in an array, the first line sensor further including a processing unit array disposed along said light receiving element array for processing and outputting photocharges generated by said plurality of light receiving elements; and a second line sensor including another light receiving element array comprising another plurality of light receiving elements arranged in an array, the second line sensor further including another processing unit array disposed along said another light receiving element array for processing and outputting photocharges generated by said another plurality of light receiving elements, wherein said first and second line sensors are disposed parallel to each other with the processing unit arrays thereof opposed to each other.

2. A sensor unit as claimed in claim 1, wherein between said first and second line sensors, a third line sensor disposed parallel to said sensors is provided.

3. A sensor unit as claimed in claim 1, wherein said first and second line sensors each comprise two line sensors disposed on the same straight line with a predetermined distance therebetween.

4. A sensor unit as claimed in claim 1, wherein said processing unit array comprises a plurality of processing units corresponding to the light receiving elements, and wherein said processing units each include an amplifier and a register.

5. A sensor unit comprising:

a plurality of line sensors each including a light receiving element array comprising a plurality of light receiving elements arranged in an array, each line sensor further including a processing unit array disposed along said light receiving element array for processing and outputting photocharges generated by said plurality of light receiving elements, said plurality of line sensors being disposed to each other, wherein at least two of said plurality of line sensors are disposed with the processing unit arrays thereof opposed to each other.

6. A sensor unit as claimed in claim 5, wherein another line sensor is disposed between said two line sensors.

7. A sensor unit as claimed in claim 5, wherein said two line sensors are situated at opposite ends of said plurality of line sensors.

8. A sensor unit as claimed in claim 5, wherein each of said plurality of line sensors comprises two line sensors disposed on the same straight line with a predetermined distance therebetween.

9. A sensor unit as claimed in claim 5, wherein said processing unit array comprises a plurality of processing units corresponding to the light receiving elements, and wherein said processing units each include an amplifier and a register.

10. A distance measurement apparatus comprising:

a plurality of line sensors disposed parallel to each other, each of said line sensors comprising a light receiving element array comprising a plurality of light receiving elements arranged in an array for converting received light into electric signals, each line sensor further comprising a processing unit array disposed along said light receiving element array for processing and outputting the electric signals converted by said plurality of light receiving elements;

first and second optical systems for projecting subject images onto said plurality of line sensors; and a calculator for obtaining a distance to a subject by performing a correlation calculation of signals outputted from at least one of said plurality of line sensors in correspondence with the subject images projected by said first and second optical systems, wherein at least two of said plurality of line sensors are disposed with the processing unit arrays thereof opposed to each other.

11. A distance measurement apparatus as claimed in claim 10, wherein another line sensor is disposed between said two line sensors.

12. A distance measurement apparatus as claimed in claim 10, wherein said two line sensors are situated at opposite ends of said plurality of line sensors.

13. A distance measurement apparatus as claimed in claim 10, wherein each of said plurality of line sensors comprises two line sensors disposed on the same straight line with a predetermined distance therebetween.

14. A distance measurement apparatus as claimed in claim 10, wherein said processing unit array comprises a plurality of processing units corresponding to the light receiving elements, and wherein said processing units each include an amplifier and a register.

15. A distance measurement apparatus as claimed in claim 10, wherein a separate distance is calculated for each line sensor that receives subject images, and wherein the distance to the subject is calculated by combining the separate distances.

16. An image sensing apparatus, comprising:

an imaging optical system;

an image sensing device;

a driver for changing a focus of the imaging optical system;

a plurality of line sensors disposed parallel to each other, each of said line sensors comprising a light receiving element array comprising a plurality of light receiving elements arranged in an array for converting received light into electric signals, each line sensor further comprising a processing unit array disposed along said light receiving element array for processing and outputting the electric signals converted by said plurality of light receiving elements;

first and second optical systems for projecting subject images onto said plurality of line sensors; and a controller for obtaining a distance to a subject by performing a correlation calculation of signals outputted from at least one of said plurality of line sensors in correspondence with the subject images projected by said first and second optical systems, and for adjusting the focus of the imaging optical system via said driver based upon the obtained distance to the subject, wherein at least two of said plurality of line sensors are disposed with the processing unit arrays thereof opposed to each other.

17. An image sensing apparatus as claimed in claim 16, wherein a separate distance is calculated for each line sensor that receives subject images, and wherein the distance to the subject is calculated by combining the separate distances.

* * * * *